May 20, 1924.
J. G. BJORK
DUST CAP FOR TIRE VALVES
Original Filed Dec. 29, 1920
1,494,578
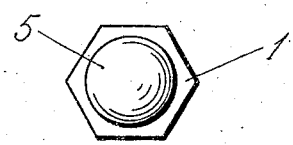
Fig. I.
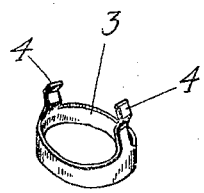
Fig. III.
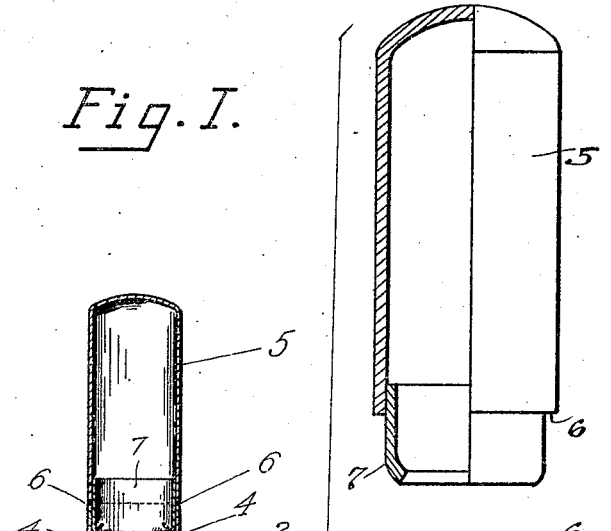
Fig. II.
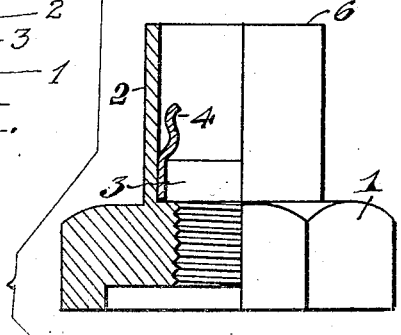
Fig. IV.
WITNESS
F. H. Goldberg.
INVENTOR
J. G. Bjork.
BY
B. Goldberg.
ATTORNEYS Patented May 20, 1924.

1,494,578

UNITED STATES PATENT OFFICE.

JOHAN GOTTFRID BJORK, OF OAKLAND, CALIFORNIA.

DUST CAP FOR TIRE VALVES.

Application filed December 29, 1920, Serial No. 433,831. Renewed March 29, 1924.

*To all whom it may concern:*

Be it known that I, JOHAN GOTTFRID BJORK, a subject of King of Sweden, residing at Oakland, in the county of Alameda and State of California, have invented a new and useful Dust Cap for Tire Valves, of which the following is a specification.

My invention relates to improvements in dust caps for tire valves, in which the bottom part remains screwed to the thread on the valve, while the top part is held to the bottom part by small leaf springs.

The objects of my invention are to construct a cap which permits access to the valve without the tedium of unscrewing or turning whatsoever, which can be removed by a straight pull, and seated again by a straight pressure, and which under normal working conditions, will securely retain its water and dust proof seat.

Further objects are to furnish a dust and water tight guide member for the dust cap and to protect the leaf springs against damage from the outside.

I attain these objects with the mechanism illustrated in the accompanying drawing, in which—

Fig. I is a plan view of the entire cap.

Fig. II is a vertical cross section through Fig. I.

Fig. III is a perspective view of the ring with the leaf springs.

Figure IV shows the cap and nut members separated, one half of each member in section and one half in elevation.

Similar numerals refer to similar parts throughout the several views.

The entire dust cap consists essentially of two parts: The lower part is in the form of a nut 1, which is screwed on the tire valve and remains permanently in place. Extending upwardly from the nut and forming an integral part thereof is a tube 2. Within the tube is a ring 3 with upwardly extending leaf springs 4, said springs being bent at their upper ends to form catches. The ring rests upon the nut and is soldered or otherwise firmly affixed to the wall of the tube 2. The upper part 5, which is the cap proper, rests on the top of the tube 2 and has the same diameter as the latter. The dividing line between the upper and lower part is indicated by the numeral 6. Soldered in the upper part is a ring 7, whose lower portion fits slidingly into the tube 2, and has an inturned edge to engage the catches on the leaf springs. With this arrangement the cap proper can be removed by a straight pull, a sufficient length of the tire valve becomes exposed to attach an air gage or a tire pump, and after inflation of the tire, the cap proper is reseated by inserting the ring 7 into the tube 2 and pressing down till the leaf springs engage the inturned edge.

Having thus described my invention, it will be seen that my objects have been accomplished, and, though I have shown the preferred form of construction, I reserve to myself the right to make minor changes, providing I do not violate the spirit and principle of my invention.

I claim:

1. In a dust cap for tire valves, a nut, a tubular member extending upwardly from the nut and integrally connected therewith, upwardly extending leaf springs attached to the inner circumference of the tubular member, said leaf springs having a hook at the upper free end, and a cap member having an inturned edge, said cap member being slidably mounted within the tubular member and engaging the hooks on the leaf springs detachably by means of the inturned edge.

2. In a dust cap for tire valves, a nut, a ring on the top of the nut concentric to the hole in said nut, upwardly extending leaf springs integrally connected with the ring, a hook at the upper end of each leaf spring, a tubular member surrounding and protecting the leaf springs, said tubular member being secured to said nut and ring, a cap member having the same outside diameter as the tubular member, a ring 7 firmly inserted in the opening of the cap member, said ring projecting outside the cap member and slidably mounted within the tubular member, an inturned edge at the edge of the ring 7, said edge engaging the hooks on the leaf springs detachably.

Signed by me at Portland, Oregon, this 23rd day of December, 1920.

JOHAN GOTTFRID BJORK.